US007468876B2

(12) United States Patent
Sullivan

(10) Patent No.: US 7,468,876 B2
(45) Date of Patent: Dec. 23, 2008

(54) SAFETY SWITCH

(75) Inventor: James D. Sullivan, Galena, OH (US)

(73) Assignee: InPower LLC, Galena, OH (US)

( * ) Notice: Subject to any disclaimer, the term of this patent is extended or adjusted under 35 U.S.C. 154(b) by 421 days.

(21) Appl. No.: 11/369,777

(22) Filed: Mar. 7, 2006

(65) Prior Publication Data

US 2007/0159748 A1 Jul. 12, 2007

Related U.S. Application Data

(60) Provisional application No. 60/756,667, filed on Jan. 6, 2006.

(51) Int. Cl.
*H02H 3/08* (2006.01)

(52) U.S. Cl. .................................................... 361/93.1

(58) Field of Classification Search ................ 361/93.1; 307/36, 141.8

See application file for complete search history.

(56) References Cited

U.S. PATENT DOCUMENTS 6,297,569 B1 * 10/2001 Bartels et al. ............... 307/140
6,570,272 B2 * 5/2003 Dickhoff .................... 307/113

* cited by examiner

*Primary Examiner*—Michael J Sherry
*Assistant Examiner*—Ann T Hoang
(74) *Attorney, Agent, or Firm*—Frank H. Foster; Kremblas, Foster, Phillips & Pollick

(57) ABSTRACT

A circuit for controlling at least one circuit breaker switch that is series connected between a source of electrical power and an electrical load. The circuit includes a programmed controller having at least two inputs and at least one output. A current sensor senses the current between the source and the load and has an output connected to a controller input. Another controller input is connected to the control input of a load power switch. The control output of the controller is connected to the control input of the circuit breaker switch. The circuit is operated by sensing the current between the source of electrical power and the electrical load and monitoring the control input of the load power switch to detect whether the load power switch is commanded to be closed or open. If the load power switch is commanded to be open, the circuit breaker switch will be opened if the sensed current value is greater than a first maximum current value. If the load power switch is commanded to be closed, the circuit breaker switch will be opened if the sensed current value is greater than a second maximum current value. The first maximum current value is greater than the maximum load current anticipated when the load power switch is open and the second maximum current value is greater than the maximum load current anticipated when the load power switch is closed.

12 Claims, 2 Drawing Sheets

SAFETY SWITCH

CROSS-REFERENCES TO RELATED APPLICATIONS

This application claims benefit of U.S. Provisional Application No. 60/756,667 filed Jan. 6, 2006.

STATEMENT REGARDING FEDERALLY-SPONSORED RESEARCH AND DEVELOPMENT

Not Applicable

(d) REFERENCE TO AN APPENDIX

Not Applicable

BACKGROUND OF THE INVENTION

1. Field of the Invention

This invention relates generally to electrical systems having a source of electrical power and an electrical load and more particularly relates to a safety switch for interrupting power to such a load in response to an excessive load current in order to prevent hazardous or damaging operation.

2. Description of the Related Art

There are many types of machines that transport people or move mechanical apparatus in the vicinity of people or otherwise require reliable control so they do not malfunction and cause personal injury or property damage. One of the most common electrical loads associated with such machines is an electric motor that is or drives a prime mover to move the mechanical apparatus. Such machines should not only operate when they are signaled or otherwise commanded to operate, but of more critical importance to safety is that they stop operating when they are signaled or otherwise commanded to stop. Although the invention is applicable to a broad variety of machines with electrical loads that have such control and safety requirements, it is illustrated in connection with one such machine, a wheelchair lift having an electric motor driven hydraulic pump as its prime mover.

In wheelchair lift systems, safety is probably the single most important factor. These lifts transport people who have a physical disability and it is particularly desirable to avoid jeopardizing them with apparatus that has the possibility of failing and causing personal injury.

FIG. 1 shows a prior art electrically operated hydraulic lift system. In such a system, electrical power is typically supplied directly from a 12 volt battery 1 through an overcurrent protection circuit breaker 2 to an electric motor M driving a hydraulic pump, which together are referred to as a hydraulic pump 4, and to internal electronics and accessories 7 that typically include flood lights. The size or capacity of the circuit breaker 2 is determined by the maximum load current anticipated from the sum of the hydraulic pump 4 current plus any additional loads that are powered such as the internal control electronics of the hydraulic lift system and any auxiliary loads 7 such as floodlights. A load power switch 3 is used to control power to the hydraulic pump 4. Because of the high amperage requirements of the hydraulic pump 4, the load power switch 3 will typically consist of a power contactor having a control coil, an input to which operates as a control input to the power contactor. Typically, the load power switch 3 is controlled by an operator from a manual switch 5 wired in series with a limit switch 6. The limit switch 6 detects a position of a mechanical component of the lift system.

In normal operation, assuming that the limit switch 6 is closed, closing the manual switch 5 commands and causes the load power switch 3 to close, in turn supplying power to the hydraulic pump 4 through the power switching terminals of the load power switch 3. When the hydraulic lift system reaches some predefined mechanical position, the limit switch 6 opens, in turn opening the load power switch 3 and stopping the hydraulic pump 4. Alternatively, the manual switch 5 can be opened which also opens the load power switch 3 and stops the hydraulic pump 4.

Every electrical apparatus has failure modes. Typically, the useful life of a power contactor is a function of its electrical contacts and the most common failure mode is a stuck or welded contact. If the contacts of the load power switch 3 were to stick or weld in a closed state, there is no way to release electrical power to the hydraulic pump 4 unless the circuit breaker 2 opens from excessive current. To ensure reliable operation of the hydraulic system, there is a need for a safety device to release power to the hydraulic pump 4 in the event of such a stuck or welded contact under all operating conditions. The battery supplies power to the hydraulic lift system at different levels under differing operating conditions. When only the internal electronics, floodlights and accessories 7 are on but current is not flowing through hydraulic pump 4, current requirements can range between slightly more than 0 amps and 10 amps, for example. When the hydraulic pump 4 is energized, this current can be in the range of 40 to 100 amps, for example.

Consequently, when only the internal electronics or floodlights 7 are operating, a current that exceeds the maximum current expected during normal operation is considerably less than the normal or maximum current expected when the hydraulic pump 4 is operating. As a result, the circuit breaker 2 must be selected to interrupt a current that is greater than the maximum expected under normal operating conditions when both the internal electronics and flood lights 7 are on and the hydraulic pump 4 is also being operated. Otherwise, the circuit breaker 2 would open under a normal operating condition. Therefore, a fault in only the circuit of the internal electronics and flood lights 7 that could cause damage or injury may not cause a current that is large enough to open the circuit breaker 2 when the hydraulic pump 4 is not operating.

More importantly, if the contacts of the load power switch 3 were to stick or weld in a closed state and there is no other fault in the circuit, the total current would not exceed the expected maximum operating current and therefore will not cause the circuit breaker 2 to open. In that event, the hydraulic pump 4 would continue moving the lift even if the operator opened the manual switch 5. Of course under this condition the lift may continue to operate until the lift comes to the end of its normal movement at which time the hydraulic pump will be overloaded causing an excessive current that would open the circuit breaker 2. However, by then, an occupant of a lift may be injured and additionally, the hydraulic pump 4 and/or other parts of the apparatus may be damaged.

Therefore, it is an object and feature of the invention to provide a circuit that can recognize when the maximum expected current through the power switching terminals of the load power switch 3 is exceeded under each of these operating conditions, indicating the existence of a failure mode, and deenergize the circuit in response to such a condition.

BRIEF SUMMARY OF THE INVENTION

The invention is a method and apparatus for controlling the switching of electric power to an electric motor for driving a mechanical load such as a hydraulic pump but is also applicable to controlling other electrical loads. The invention detects failure modes and prevents hazardous operation after a failure mode is detected. Generally, the invention involves (1) monitoring the current being drawn by the load; (2) monitoring the operating current or voltage associated with one or more load power switches that control the current through the load; (3) determining from these monitored parameters the commanded status or condition of the load power switch, thereby determining, by means of the logic functions of a controller, whether they have malfunctioned or are damaged,; and (4) if a malfunction is detected, preventing or aborting further operation of the motor or other load, by means of the controller, by opening a circuit breaker switch to interrupt power to the load.

In the preferred embodiment, the invention has a programmed controller having at least two inputs and at least one output. The invention includes a current sensor that has an input connected to sense the current between the source of electrical power and the electrical load and has an output connected to one of the controller inputs to provide a signal representing a sensed load current. Another controller input is connected to monitor the control input of a load power switch to provide the controller with a signal representing the commanded state of the load power switch. The output of the controller is connected to the control input of a circuit breaker switch that is series connected between the source of electrical power and the electrical load, for opening the switch and de-energizing the load in response to a signal from the controller.

The invention is operated by continuously monitoring the current between the source of electrical power and the electrical load to provide a sensed load current value. The control input of the load power switch is also continuously monitored to detect whether the load power switch is commanded to be closed or open. If the load power switch is commanded to be open, the controller continuously compares the sensed load current value to a first maximum current value that is greater than the maximum load current anticipated when the load power switch is open. If the load power switch is commanded to be open and the sensed load current value is greater than the first maximum value, the controller sends a signal to the control input of the circuit breaker switch commanding the switch to open, thereby de-energizing the load. If the load power switch is commanded to be closed, the controller continuously compares the sensed load current value to a second maximum current value that is greater than the maximum load current anticipated when the load power switch is closed. If the load power switch is commanded to be closed and the sensed load current value is greater than the second maximum value, the controller sends a signal to the control input of the circuit breaker switch commanding the switch to open, thereby de-energizing the load.

The circuit of the invention may be reset and the circuit breaker switch closed by means of a manual operation such as removing power and/or ground from the safety switch.

Figure 1:
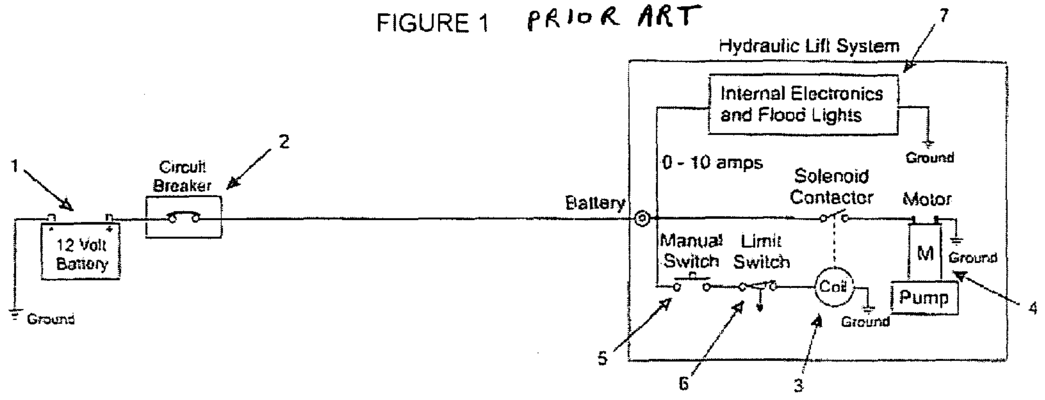
FIGURE 1 PRIOR ART
FIG. 1 is a schematic diagram of a typical, prior art, electrically operated hydraulic lift system such as used for a wheel chair lift installed on a motor vehicle.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Figure 2:
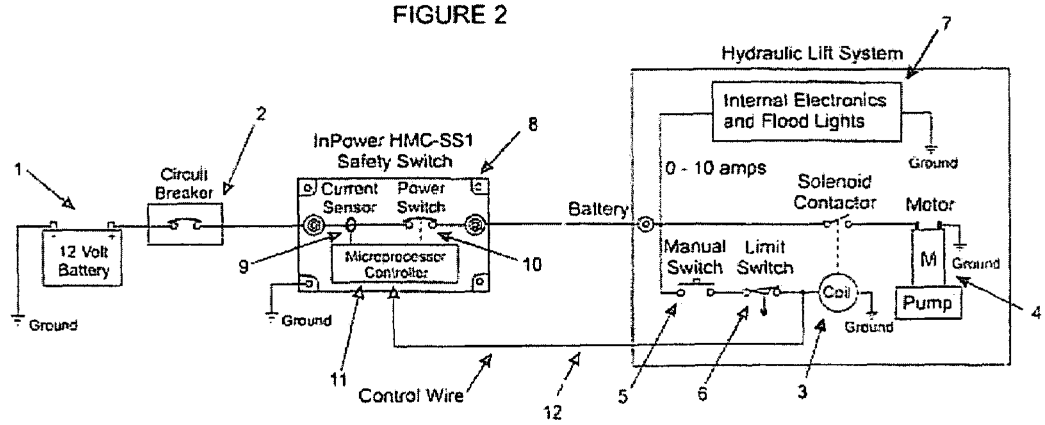
FIG. 2 is a schematic of the circuit of FIG. 1 and an embodiment of the invention inserted in the prior art circuit

The invention is illustrated in the diagram in FIG. 2 and is labeled safety switch 8. The safety switch 8 consists of a circuit breaker switch 10, a current sensor 9 and a controller 11. The invention is wired in series with the circuit breaker 2 and the hydraulic lift system such that current is interrupted and the circuit is de-energized when the internal circuit breaker switch 10 of the safety switch 8 is opened. The current sensor 9 continuously monitors the current flow to the hydraulic lift system and applies its output signal, representing system current, to the controller 11. If the controller is a microprocessor or other digital controller, it converts the current signal to digital format for use in processing the logic operations of the circuit. The controller 11 of the invention is also wired by connection 12 to monitor the control input of a load power switch 3 in the hydraulic lift system such that controller 11 can detect if and when the load power switch 3 is commanded to open or close.

The safety switch 8 acts as a circuit breaker and is designed to open at a first level of current when the controller 11 detects that the load power switch 3 has not been commanded to close, and opens at a second level of current if the controller 11 detects that the load power switch 3 has been commanded to close. The first level of said current is set at a level greater than the current that is drawn when the internal electronics, floodlights and accessories 7 are energized. The second level of said current is set at a level greater than the current that is drawn when both the internal electronics, floodlights and accessories 7 and the hydraulic pump 4 are energized. For example, if the current drawn by the internal electronics, floodlights and accessories 7 of a particular electrically operated hydraulic lift system is in the range of 0 to 10 amps, the first level may be set at 15 amps. If the same electrically operated hydraulic lift system draws a current of 100 amps with all circuits turned on, the second level may be set at 120 amps, for example. Of course different levels are selected for lift systems drawing different currents. Similarly, the margin by which these current levels exceed the expected operating current under these conditions are chosen by the designer and preferably exceed the expected current levels for normal operation by at least 10%.

The controller 11 of the safety switch 8 continuously monitors the state of the load power switch 3 and controls the operation of the circuit breaker switch 10. When both the limit switch 6 and the manual switch 5 are closed, the load power switch 3 is commanded to close. When the controller 11 detects that the load power switch 3 has been commanded to close, the circuit breaker switch 10 will open if the load current detected by current sensor 9 is greater than the second level of current. In this mode, the safety switch acts as a circuit breaker and will open, for example, if the electric motor of the hydraulic pump were to develop an internal short. When the controller 11 detects that the load power switch 3 has been commanded to open, the circuit breaker switch 10 will open if load current detected by current sensor 9 is greater than the first level of current. In this mode, the safety switch acts as a circuit breaker and will open the circuit even though the current does not exceed the normal operating current of the hydraulic pump 4. The safety switch also will open, for example, if an electrical short occurred in the internal electronics or floodlights 7 but the normal operating current of the hydraulic pump 4 has not been exceeded. Consequently, the safety switch 8 of the invention operates as a smart circuit breaker which breaks the circuit when the current exceeds one of two levels, the applicable level being determined by the commanded state of the load power switch 3.

Consequently, if the load power switch 3 were to fail with its contacts stuck or welded closed, the hydraulic pump load current would continue to flow after the manual switch 5 or limit switch 6 were opened to command the load power switch 3 to open. The safety feature of the invention comes into play when the controller 11 of the safety switch 8 detects load current from current sensor 9 greater than said first level of current and the controller 11 detects that the load power switch 3 is commanded to open. In this event, controller 11 will open the circuit breaker switch 10 of the safety switch 8 to remove power to hydraulic pump system. The circuit breaker switch 10 of the safety circuit 8 will remain open until a reset sequence is initiated.

The reset sequence may include and be based upon removing battery input power to the safety switch, removing ground from the safety switch, or some other positive means to ensure a reset under controlled conditions, all of which can be detected by the controller 11. After a reset, the controller 11 will close the circuit breaker switch 10 until the next fault condition is detected.

Because the safety switch performs the function of a circuit breaker the conventional circuit breaker 2 can be eliminated.

Figure 3:
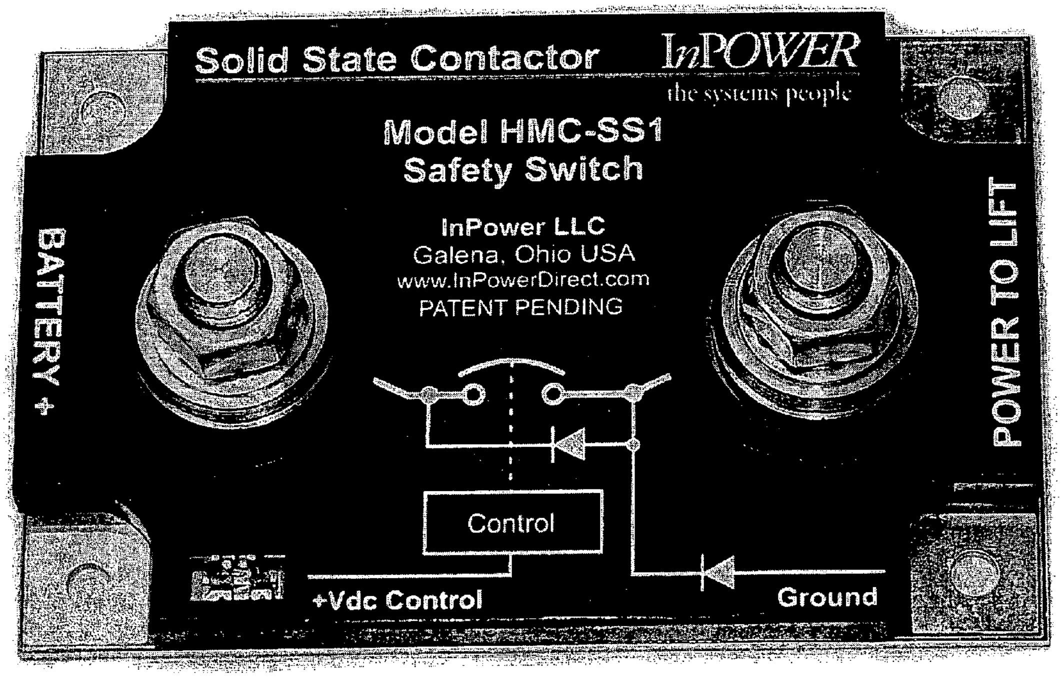
FIG. 3 is a photograph of a device embodying the invention.

Because the load power switch 3 requires a finite time to switch states and that time is ordinarily longer than the time for the controller 11 to receive and process a signal indicating a change in the input that controls the contactor 3, some time delay is ordinarily required before the controller 11 changes the trip level that it compares to the current sensed by the current sensor 9 to in order to determine whether to open the circuit breaker switch 10. A mechanical solenoid contactor will require a longer time delay than a solid state circuit breaker switch. For example, the required delay for a mechanical circuit breaker switch may be on the order of 50 to 75 milliseconds while a solid state circuit breaker switch may require less than one millisecond. This time delay is included in the programming or logic of the controller 11. The use of a conventional flyback diode, illustrated in FIG. 3, shunts the current to ground, that results from opening the circuit to the hydraulic pump 4, thereby reducing the time delay that is required when the manual switch 5 is opened.

The above example of an embodiment of the invention illustrates the use of the safety switch with an electric motor driven hydraulic pump. An embodiment of the invention is usable for any electric motor driven mechanical system that includes one or more control switches operating load power switch, such as a solenoid or power contactor, for controlling power to the motor.

Many means exist and may be used for determining the status of the load power switch controlling the pump motor including voltage sensing and current sensing techniques. For example, if the load power switch consists of a solenoid contactor with a control coil, the voltage across the contactor or the current flowing through the contactor's control coil windings can be monitored to signal the commanded status of the contactor.

Many means exist and may be used to monitor load current including series resistors and magnetic current sensors.

Although the preferred controller 11 is a microprocessor controller, many alternative means exist to provide the controller functions. As known to those skilled in the art, there are a variety of commercially available, non-microprocessor based controllers that can provide the controller functions and therefore are equivalent and can be substituted for the microprocessor controller. The sensing functions can be performed by separate circuitry or can be provided on-board a controller. Suitable controllers can include equivalent digital and analog circuits available in the commercial marketplace. Examples of controllers that can be used for the controller of the invention include microprocessors, controllers, programmable gate arrays, digital signal processors, field programmable analog arrays and logic gate arrays. Such circuits can be elementary digital logic circuits and can be constructed of discrete components such as diodes and transistors. Therefore the term "controller" is used to generically refer to any of the combinations of digital logic and analog signal processing circuits that are available or known and can be constructed, programmed or otherwise configured for performing the logic functions of the controller as described above.

While certain preferred embodiments of the present invention have been disclosed in detail, it is to be understood that various modifications may be adopted without departing from the spirit of the invention or scope of the following claims.

The invention claimed is:

1. A method for protecting a circuit having a source of electrical power connected to an electrical load through a series connected circuit breaker switch and a load power switch having a control input, for de-energizing the load in response to an excessive load current, the method comprising:

(a) continuously sensing the current from the source of electrical power to the electrical load to provide a sensed load current value;

(b) continuously monitoring the control input of the load power switch to detect whether the load power switch is commanded to be closed or open;

(c) if the load power switch is commanded to be open, continuously comparing the sensed load current value to a first maximum current value and opening the circuit breaker switch if the sensed current value exceeds the first maximum value; and (d) if the load power switch is commanded to be closed, continuously comparing the sensed load current value to a second maximum current value which is greater than the first maximum current value and opening the circuit breaker switch if the sensed load current value exceeds the second maximum value.

2. A method in accordance with claim 1 wherein (a) the first maximum current value is greater than the maximum load current anticipated when the load power switch is open; and (b) the second maximum current value is greater than the maximum load current anticipated when the load power switch is closed.

3. A method in accordance with claim 2 wherein (a) the first maximum current value exceeds by at least substantially 10 percent the maximum load current anticipated when the load power switch is open; and (b) the second maximum current value exceeds by at least substantially 10 percent the maximum load current anticipated when the load power switch is closed.

4. A method in accordance with claim 1 wherein the method further comprises resetting the circuit breaker switch and closing the circuit breaker switch in response to removal of power from the circuit breaker switch.

5. A method in accordance with claim 1 wherein the method further comprises resetting the circuit breaker switch and closing the circuit breaker switch in response to removal of ground from the circuit breaker switch.

6. A safety switch for interrupting a load current between a source of electrical power and an electrical load through a series connected load power switch, for de-energizing the load in response to an excessive load current, the safety switch comprising:

(a) a current sensor having an input connected in series between the source of electrical power and the electrical load for sensing the current flowing from the source to the load, and having an output providing a signal representing the sensed current;

(b) a circuit breaker switch having a control input and power switching terminals connected in series between the source of electrical power and the electrical load; and (c) a controller having at least two inputs and at least one output, the controller having (i) an input connected to the output of the current sensor;

(ii) an input connected to the control input of the load power switch for providing a signal representing the commanded state of the load power switch; and (iii) an output connected to the control input of the circuit breaker switch.

7. A safety switch in accordance with claim 6 wherein the controller is programmed or constructed to (a) continuously compare the sensed current value to a first maximum current value if the load power switch is commanded to be open;

(b) continuously compare the sensed current value to a second maximum current value, which is greater than the first maximum current value if the load power switch is commanded to be closed;

(c) open the circuit breaker switch if the load power switch is commanded to be open and the sensed current value exceeds the first maximum current value; and (d) open the circuit breaker switch if the load power switch is commanded to be closed and the sensed current value exceeds the second maximum current value.

8. A safety switch in accordance with claim 7 wherein (a) the first maximum current value is greater than the maximum load current anticipated when the load power switch is open; and (b) the second maximum current value is greater than the maximum load current anticipated when the load power switch is closed.

9. A safety switch in accordance with claim 8 wherein (a) the first maximum current value exceeds by at least substantially 10 percent the maximum load current anticipated when the load power switch is open; and (b) the second maximum current value exceeds by at least substantially 10 percent the maximum load current anticipated when the load power switch is closed.

10. A safety switch in accordance with claim 6 wherein the load power switch comprises a power contactor having a control coil and an input of the controller is connected to the control coil to provide a signal to the controller representing the commanded state of the load power switch.

11. A safety switch in accordance with claim 6 wherein the controller is programmed or constructed to reset the safety switch and close the circuit breaker switch when power is removed from the safety switch.

12. A safety switch in accordance with claim 6 wherein the controller is programmed or constructed to reset the safety switch and close the circuit breaker switch when ground is removed from the safety switch.

* * * * *